B. KRÄMER.
COMBINED STARTING AND RELIEF VALVE.
APPLICATION FILED SEPT. 19, 1912.
1,122,008.
Patented Dec. 22, 1914.
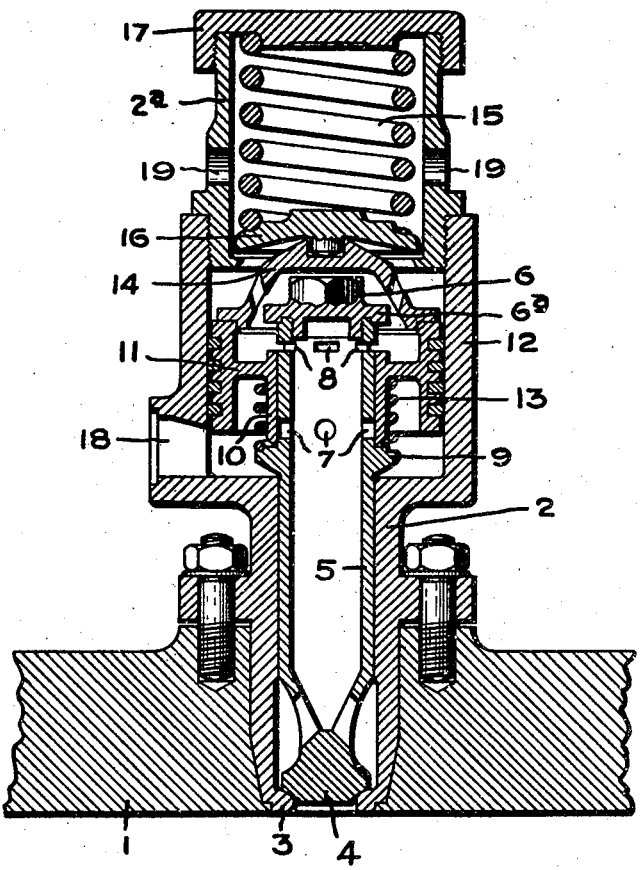
Witnesses:
Marcus L. Byng.
Earl G. Klock.
Inventor,
Bernhard Krämer,
by
Atty.

UNITED STATES PATENT OFFICE.

BERNHARD KRÄMER, OF CHARLOTTENBURG, GERMANY, ASSIGNOR TO GENERAL ELECTRIC COMPANY, A CORPORATION OF NEW YORK.

COMBINED STARTING AND RELIEF VALVE.

1,122,008.  Specification of Letters Patent.  Patented Dec. 22, 1914.

Application filed September 19, 1912. Serial No. 721,226.

*To all whom it may concern:*

Be it known that I, BERNHARD KRÄMER, a subject of the Emperor of Germany, residing at Charlottenburg, Germany, have invented certain new and useful Improvements in Combined Starting and Relief Valves, of which the following is a specification.

This invention relates to internal combustion engines and especially to that type in which high pressures occur, either by compression or combustion. In order not to subject the cylinders to excessive strains, it is desirable to provide a safety member which will open automatically when a certain permissible pressure is exceeded, and permit the contents of the cylinder to blow off. A special relief valve is not desirable, because it is liable to get clogged by soot or become fused to its seat, unless it is frequently opened. In order to insure this necessary opening at reasonable intervals, I have utilized as a safety device one of the valves which controls the admission of motive fluid to the cylinder, modifying its construction to enable it to fulfil its double function. The blow-off exit is separate from the conduit which conveys the motive fluid to the engine, and is closed when said fluid is entering or leaving the cylinder.

Among the various valves of the machine, the one which admits compressed air for starting is particularly well adapted for the function of a relief valve, because it is actuated every time the engine is started or reversed; although, in distinction from the other parts, it performs only a few movements, just sufficient to keep it constantly in operative condition.

The accompanying drawing is a longitudinal section of a combined starting and relief valve embodying my invention.

Securely fastened in an opening in the wall of the cylinder 1 is a valve casing 2 having a seat 3 for the valve 4 which is provided with a tubular shank 5 having a fluid-tight sliding fit in the casing. The upper end of said shank is closed, as by the plug 6 whose flange 6ª forms a shoulder. Two sets of ports 7, 8 are cut in the shank above an external shoulder 9. Sliding on the shank between said shoulders is a sleeve 10 which controls the ports 7, 8. A piston 11 is connected to said sleeve and works fluid-tight in a cylindrical portion 12 of the casing. A helical spring 13 of suitable strength is located between and abuts the piston and the shoulder 9. A yoke 14 straddles the upper end of the shank 5 and rests on the piston. A stout helical spring 15 is seated on a follower 16 supported by said yoke, the upper end of said spring abutting against an adjustable cap 17 screwed on the upper perforated end of the casing 2 or an extension 2ª thereof.

To start the engine, a charge of compressed air is admitted through the inlet 18 below the piston 11 which instantly rises against the tension of the spring 15. The upward movement of the sleeve 10 first closes the ports 8 and then opens the ports 7, admitting the compressed air to the interior of the tubular shank 5. The spring 13 keeps the valve 4 shut while the sleeve 10 is rising, until the latter strikes the flange 6ª on the plug 6 and positively lifts the valve. This admits the air to the cylinder and the engine starts. It will be noticed that the action of this valve is quick and positive, so that no time is lost and no air is wasted, and the engine derives the best effect from the starting charge.

After the engine has been properly started by compressed fluid the supply thereof by the conduit 18 is shut off, or the pressure suitably reduced, which permits the piston 11 to move downward under spring pressure and in so doing to close the valve 4. After this the engine operates in a normal manner, fuel being introduced into the cylinder 1 at the proper time by any suitable means. Now in case there occurs an abnormal pressure in the cylinder, so great as to be dangerous, the valve 4, which remains closed during the normal operation of the engine, will be forced open by the pressure in the cylinder, lifting the sleeve 10, piston 11, and yoke 14 against the tension of the spring 15. The gases producing the abnormal pressure at once blow off through the shank 5, the ports 8 and the perforations 19 in the upper part of the casing. Since the ports 8 are above the piston 11, none of said gases can find their way into the conduit for supplying the compressed air nor can the compressed air escape.

After the abnormal pressure has been decreased to a predetermined value by reason of the escape of gases from the cylinder through the ports 8, the valve 4 is closed by the spring 15.

It will be noted that the tubular shank 5 has two sets of ports, only one of which can be open at the time. The ports 7 are normally closed and the ports 8 normally open, both being controlled by the sleeve 10 which is actuated by the piston 11. This arrangement is of material benefit in simplifying the apparatus as a whole and in reducing the number of parts. Each time the engine is started the valve 4 is opened which is an insurance against the valve sticking when the pressure in the cylinder becomes abnormally great.

In accordance with the provisions of the patent statutes, I have described the principle of operation of my invention, together with the apparatus which I now consider to represent the best embodiment thereof; but I desire to have it understood that the apparatus shown is only illustrative, and that the invention can be carried out by other means.

What I claim as new and desire to secure by Letters Patent of the United States, is,—

1. In an engine of the character described, the combination of a cylinder, a combined starting and safety valve whose face is exposed to the pressure existing within the cylinder to cause it to open outwardly on a predetermined cylinder pressure, an outlet port through which the contents of the cylinder may escape when the valve is opened in response to cylinder pressure, a fluid-actuated means for opening the valve to admit starting fluid to the cylinder, and a device to prevent said fluid from escaping through the outlet port when said valve is opened by said means.

2. In an engine of the character described, the combination of a cylinder, a combined starting and safety valve, a casing therefor having means for connecting the interior thereof to a region of lower pressure, a fluid-actuator for the valve, and means moved by the actuator and coöperating with the valve for controlling the first named means to prevent the escape of fluid under pressure from the casing to the region of lower pressure, said parts being so arranged that each time the actuator is moved it moves said second named means.

3. In an engine of the character described, the combination of a cylinder, a combined emergency and starting valve, said valve being exposed to the pressure within the cylinder and arranged to open when said pressure becomes excessive, means opposing the opening movement of the valve, and means responsive to fluid pressure for opening the valve and causing it to admit fluid under pressure to the cylinder for starting purposes.

4. A valve for admitting motive fluid to the cylinder of an internal combustion engine, combined with means for positively opening it to admit said fluid, and a spring for holding it yieldingly closed, whereby it can open automatically to relieve an abnormal pressure in said cylinder.

5. A combined admission and relief valve for internal combustion engines, comprising a valve casing, an outwardly opening unbalanced valve therein which is exposed to cylinder pressure, a piston for opening said valve by fluid pressure, a spring for holding it yieldingly closed against the cylinder pressure, and an exhaust port that is exposed when the cylinder pressure opens the valve.

6. A combined admission and relief valve for internal combustion engines, comprising a valve casing having an inlet for motive fluid, a valve therein, a tubular shank for said valve containing ports, a piston movably connected to said shank for controlling said ports, and a spring holding said valve yieldingly closed.

7. A combined admission and relief valve for internal combustion engines, comprising a valve casing having an inlet for motive fluid, a valve therein having a tubular shank containing ports, a sleeve slidable on said shank and controlling said ports, a piston for actuating said sleeve, and a spring holding said valve yieldingly closed.

8. A combined admission and relief valve for internal combustion engines, comprising a valve casing having an inlet for motive fluid, a valve therein having a tubular shank containing two sets of ports, a sleeve on said shank normally closing one set of ports, a piston connected with said sleeve, and a spring bearing on said piston.

9. A combined admission and relief valve for internal combustion engines, comprising a valve casing having an inlet for motive fluid, a valve therein having a tubular shank containing two sets of ports, shoulders on said valve above and below said ports, a sleeve slidable between said shoulders and controlling said ports, a piston connected to said sleeve, and a spring bearing on said piston.

10. In an internal combustion engine, the combination of a valve the face of which is exposed to cylinder pressure and moves outwardly when said pressure exceeds a predetermined value, a spring which normally holds the valve on its seat against the cylinder pressure, an outlet port through which the contents of the cylinder may pass when the valve is opened in response to cylinder pressure, and a piston actuated by compressed fluid which opens the valve against the action of the spring to admit said fluid to the cylinder and also closes the outlet port.

11. The combination with an internal combustion engine having a cylinder and working piston of a combined starting and relief valve therefor comprising a valve casing, an outwardly opening valve therein which is exposed to cylinder pressure, fluid actuated means for opening said valve to admit starting fluid to the cylinder, a passage connecting the interior of said valve casing to a region of lower pressure, and means for closing said passage prior to the opening of the starting valve.

12. The combination with an internal combustion engine having a cylinder and working piston of a combined starting and relief valve therefor comprising a valve casing, an outwardly opening valve therein which is exposed to cylinder pressure, fluid actuated means controlled by the starting fluid for opening said valve to admit starting fluid to the cylinder, a passage connecting the interior of said valve casing to atmosphere, and means for closing said passage prior to the opening of the starting valve.

13. The combination with an internal combustion engine having a cylinder and working piston of a combined starting and relief valve therefor comprising a valve casing, an outwardly opening valve therein which is exposed to cylinder pressure, fluid actuated means for opening said valve to admit starting fluid to the cylinder, a passage connecting the interior of said valve casing to a region of lower pressure, and means controlled by the fluid actuated means for closing said passage prior to the opening of the starting valve.

In witness whereof, I have hereunto set my hand this third day of September, 1912.

BERNHARD KRÄMER.

Witnesses:
ERICH ÜBERLÉE,
GUST. HÜLBROCK.